United States Patent
Fong et al.

(10) Patent No.: US 10,203,988 B2
(45) Date of Patent: Feb. 12, 2019

(54) ADAPTIVE PARALLELISM OF TASK EXECUTION ON MACHINES WITH ACCELERATORS

(71) Applicant: INTERNATIONAL BUSINESS MACHINES CORPORATION, Armonk, NY (US)

(72) Inventors: Liana L. Fong, Irvington, NY (US); Wei Tan, Elmsford, NY (US); Xiaolong Xie, Beijing (CN); Husheng Zhou, Dallas, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 15/293,248

(22) Filed: Oct. 13, 2016

(65) Prior Publication Data
US 2018/0107524 A1    Apr. 19, 2018

(51) Int. Cl.
*G06F 9/50*    (2006.01)

(52) U.S. Cl.
CPC ................ *G06F 9/5061* (2013.01)

(58) Field of Classification Search
CPC ..................................... G06F 9/5083
See application file for complete search history.

(56) References Cited

U.S. PATENT DOCUMENTS

| | | | |
|---|---|---|---|
| 8,669,990 B2 | 3/2014 | Sprangle et al. | |
| 8,874,943 B2 | 10/2014 | Majumdar et al. | |
| 2010/0088490 A1 | 4/2010 | Chakradhar et al. | |
| 2011/0173155 A1 | 7/2011 | Becchi et al. | |
| 2014/0068343 A1* | 3/2014 | Nakajirna; Jun | ... G06F 11/3051 714/39 |
| 2015/0371357 A1* | 12/2015 | Ben-Natan | ............ G06F 9/5027 345/505 |
| 2016/0055612 A1 | 2/2016 | Barik et al. | |

OTHER PUBLICATIONS

Anonymous "Feedback Drive Performance Optimization of ETL Processes in Accelerators Across Multiple Source and Target Systems," ip.com, Oct. 27, 2015.
Anonymous "Workload Optimization Through Dynamic Reconfiguration of Compute Nodes," ip.com, Feb. 26, 2012.
Li et al., "HeteroSpark: A Heterogeneous CPU/GPU Spark Platform for Deep Learning Algorithms," 2015 IEEE International Conference on Networking, Architecture and Storage (NAS), Boston, MA, Aug. 2015.

(Continued)

*Primary Examiner* — Charlie Sun
(74) *Attorney, Agent, or Firm* — Intelletek Law Group, PLLC; Gabriel Daniel, Esq.

(57) ABSTRACT

A computer system, method, and computer readable product are provided for adaptive parallelism of workload execution on computers with accelerators. In various embodiments, information about both static and dynamic characteristics of computational accelerators for a plurality of computers is received. Based on this information, waves of a workload is divided among this plurality of computers for processing. As the dynamic characteristics of those computational accelerators change over time, future waves may be divided among this plurality of computers differently.

18 Claims, 8 Drawing Sheets

(56) References Cited

OTHER PUBLICATIONS

Sabne et al., "HeteroDoop : A MapReduce Programming System for Accelerator Clusters," Proceedings of the 24th International Symposium on High-Performance Parallel and Distributed Computing (HPDC 2015), Portland, OR, Jun. 2015.

Xie et al., "Enabling Coordinated Register Allocation and Thread-Level Parallelism Optimization for GPUs," Proceedings of the 48th International Symposium on Microarchitecture (MICRO-48), Waikiki, HI, Dec. 2015.

* cited by examiner

|  | Column 422 | Column 424 | Column 426 |
| --- | --- | --- | --- |
| Partitions 402 | - | Increase | Increase |
| Parallelism 404 | Increase | - | Increase |
| Number of Waves 406 | Decrease | Increase | - |
| Total Tasks 408 | - | Increase | Increase |
| Shuffle Time 410 | Decrease | Increase | Decrease |
| Reduce Time 412 | Decrease | Increase | Decrease |
| Task Concurrency/GPU 414 | Increase | - | Increase |
| GPU Memory Pressure 416 | Increase | Decrease | Increase |
| GPU Utilization 418 | Increase | Decrease | Increase |
| Scheduling Overhead 420 | Decrease | Increase | Decrease |

Table 400

Fig. 4

ADAPTIVE PARALLELISM OF TASK EXECUTION ON MACHINES WITH ACCELERATORS

BACKGROUND

The present application relates to clustered computing. In clustered computing, a workload (sometimes referred to as a computing task or a work unit) may be divided to execute over multiple computers (sometimes referred to as computers), which are sometimes referred to as nodes. One or more computers of the cluster may be responsible for dividing the workload into multiple parts, and assigning each part to a node, which will then process that part of the workload. The computers of a cluster may be communicatively connected via a local area network (LAN).

SUMMARY

In various embodiments, a computing unit that implements an embodiment of the present disclosure receives information about a configuration of the first computer, the information about the first computer comprising an indication about a first characteristic of a computational accelerator that remains constant regardless of a workload performed by the computational accelerator, and a second characteristic of the computational accelerator that may vary based on the workload performed by the computational accelerator. This computing unit (sometimes referred to as a computing device) also receives information about a configuration of a second computer of the plurality of computers;

This computing unit then divides a first workload of a plurality of workloads into a first subportion and a second subportion based on the first characteristic of the computational accelerator, the second characteristic of the computational accelerator, and the configuration of the second computer. Having done that, this computing unit then assigns the first subportion to the first computer for execution, and the second subportion to the second computer for execution.

After assigning the first subportion to the first computer, the computing unit receives an indication that a value of the second characteristic of the computational accelerator has changed. The computing unit then divides a second workload of the plurality of workloads into a third subportion and a fourth subportion based on the first characteristic of the computational accelerator, the changed second characteristic of the computational accelerator, and the configuration of the second computer. And the computing unit assigns the third subportion to the first computer for execution, and the fourth subportion to the second computer for execution.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 illustrates relationships between the amount of parallelism and the number of partitions for a given dataset.

DETAILED DESCRIPTION

Detailed embodiments of the claimed structures and methods are disclosed herein. However, it may be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Figure 1:
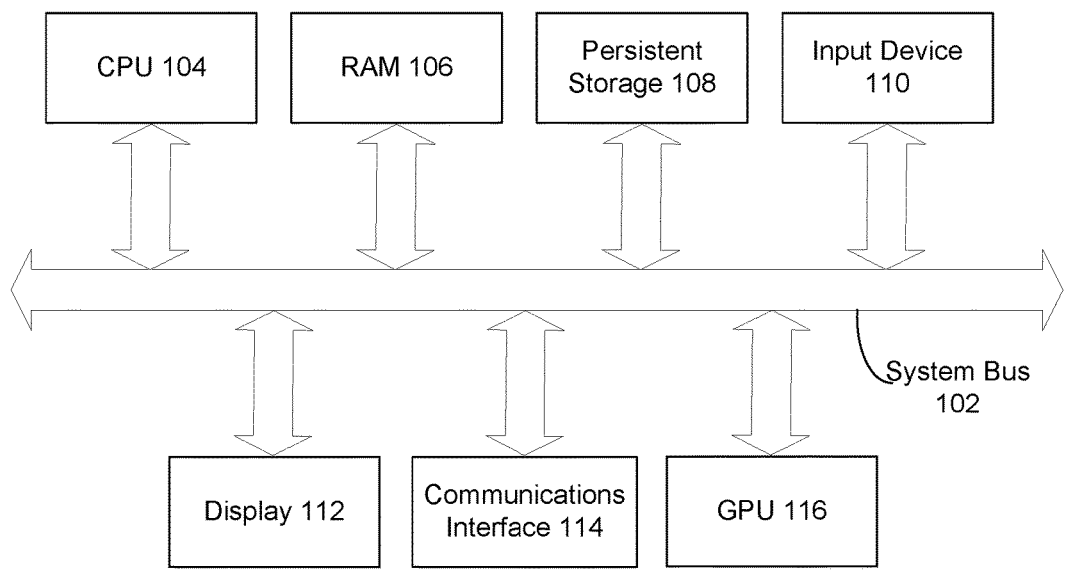
FIG. 1 illustrates examples of hardware used according to embodiments of the present disclosure.

FIG. 1 illustrates examples of hardware used according to embodiments of the present disclosure. As shown in FIG. 1, a block diagram illustrates examples of computer hardware that may be used according to embodiments of the present disclosure for adaptive parallelism of workload execution on computers with accelerators. CPU (central processing unit) 104, RAM (random access memory) 106, persistent storage 108, input device 110, display 112, communications interface 114, and GPU (graphics processing unit) 116 are connected to a system bus 102. It may be appreciated that system bus 102 is presented logically and simplified, and that two or more of these components may be communicatively coupled by one or more separate buses.

In FIG. 1, persistent storage 108, in an embodiment of the present disclosure, has capabilities that include storing a program that can execute the processes described herein. Persistent storage 108, in an embodiment of the present disclosure, can store an executing application that manages a computing cluster that has at least one computational accelerator and executes computer-executable instructions in response to executing workloads on this cluster using adaptive parallelism. The embodiments described herein generally involve the use of a GPU as a computational accelerator. It may be appreciated that there are other computational accelerators that may be used in other embodiments, such as a cryptographic accelerator, a video processing unit, or an artificial intelligence (AI) accelerator.

Additionally, in FIG. 1, an input device 110, such as a keyboard and a mouse may be used to provide input to the computer hardware of FIG. 1. For example, this input may be made to manage the operation of the computing cluster that uses adaptive parallelism of workload execution.

In one embodiment, the communications interface 114 of FIG. 1 is connected to a communications network using a WiFi (wireless-fidelity) or LTE (long-term evolution) network communications protocol. Communications interface 114 may also comprise a network interface card (NIC) that is connected to a communications network via an Ethernet cable. In the present disclosure, communications interface 114 may transmit a subportion of a workload to a node of a computing cluster along with an indication for the node to process the subportion, and to receive information from the node regarding the node processing the subportion.

In the present disclosure, communications interface 114 may receive processing requests in accordance with a communication protocol, for example TCP/IP (Transmission Control Protocol/Internet Protocol), from another computer (not shown), and processing results are sent to a third computer (not shown). As depicted, communications interface 114 may comprise hardware for transmitting and receiving network data, and/or processor-executable instructions for doing the same. It may be appreciated that the depictions of CPU 204 and GPU 216 are simplified to emphasize the components that are depicted—for example they omit hardware that controls the flow of computer-executable instructions within them.

Figure 2:
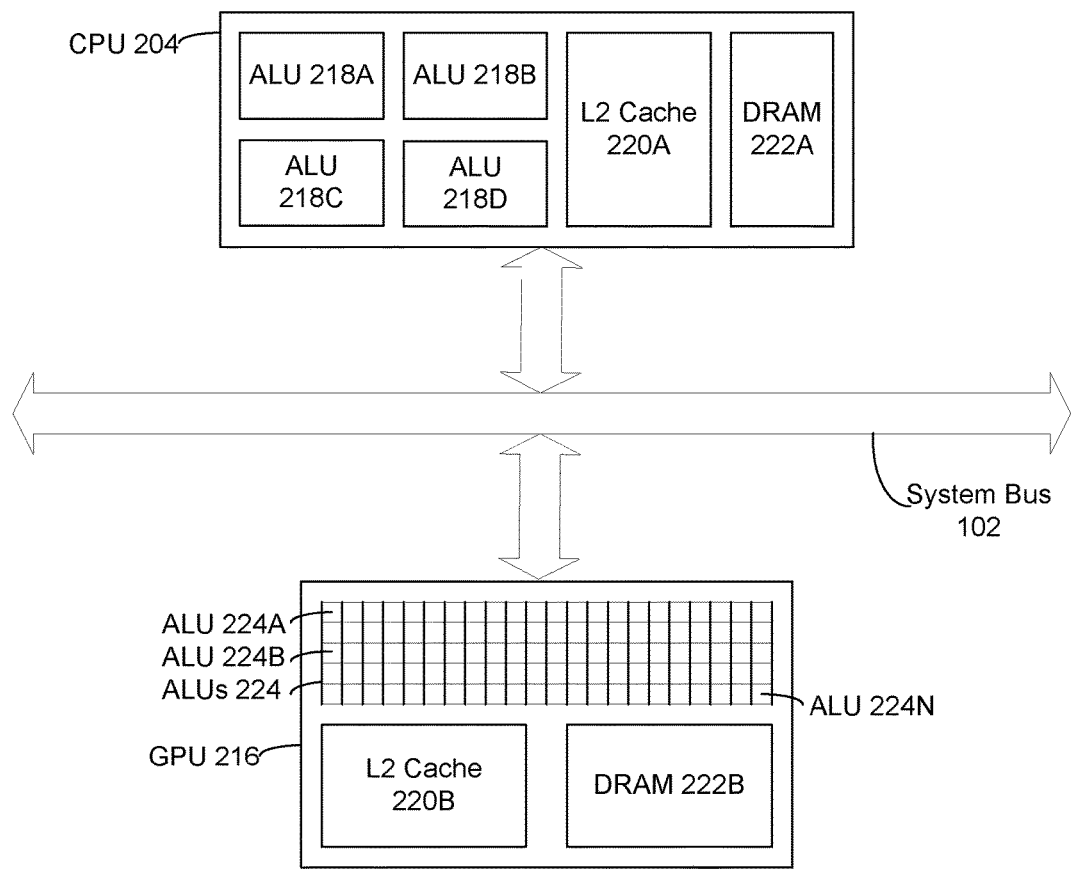
FIG. 2 illustrates examples of a CPU and GPU that may be implemented in the hardware of FIG. 1.

FIG. 2 illustrates examples of a CPU and GPU that may be implemented in the hardware of FIG. 1. For example, in embodiments, CPU 204 may be used to implement CPU 104 of FIG. 1, and GPU 216 may be used to implement GPU 116 of FIG. 1. Both CPU 204 and GPU 104 are communicatively coupled by system bus 102. CPU 204 comprises ALU (arithmetic logic unit) 218A, ALU 218B, ALU 218C, ALU 218D, L2 cache (level 2 cache) 220A, and DRAM (dynamic random access memory) 222A.

ALUs 218A-218D are a portion of a processor that executes binary computer-executable instructions. L2 cache 220A is a type of memory that is typically faster (in retrieving information from and storing information to) than DRAM 222A. The tradeoff is that L2 cache 220A is typically also able to store less information than DRAM 222A. Then DRAM 222A is also a type of memory, and it is typically slower than, but also able to store more than, L2 cache 220A. And there may be other types of memory in CPU 204 that are not depicted here, such as registers (smallest and fastest) and a L1 cache (level 1 cache; larger and slower than registers, but smaller and faster than L2 cache 220A).

GPU 216 also comprises a plurality of ALUs—ALUs 224A and 224B, through 224N—L2 cache 220B, and DRAM 222B. ALUs 224A-N, L2 cache 220B, and DRAM 222B may perform similar functions for GPU 216 as ALUs 218A-D, L2 cache 220A, and DRAM 222A perform for CPU 204.

It may be observed that GPU 216 is depicted as having many more ALUs 224A-N than CPU 204 has. This may generally be true as a difference between GPUs and CPUs. For example, a CPU might have 8 ALUs, capable of executing a total of 16 threads, with each ALU operating at a clock frequency of 3.1 GHz. Then, a GPU might have 2880 ALUs, capable of executing a total of 30,720 threads, with each ALU operating at a clock frequency of 745 MHz.

Based on these different architectures, these different processors might excel at different types of workloads. For example, if a given workload cannot be divided into a plurality of subworkloads to be performed in parallel, it may be that executing the workload on a CPU, with its faster clock speed (which generally correlates to faster processing, depending on other factors, like instruction set architecture), results in the workload being performed faster than performing the workload on a GPU. However, if a given workload can be divided into a plurality of subworkloads to be performed in parallel, it may be that executing the workload on a GPU results in the workload being performed faster than performing the workload on a CPU. And there may be cases where the workload may be performed fastest using a combination of a GPU and CPU (or a combination of multiple GPUs and/or multiple CPUs, where such a system architecture is present).

Figure 3:
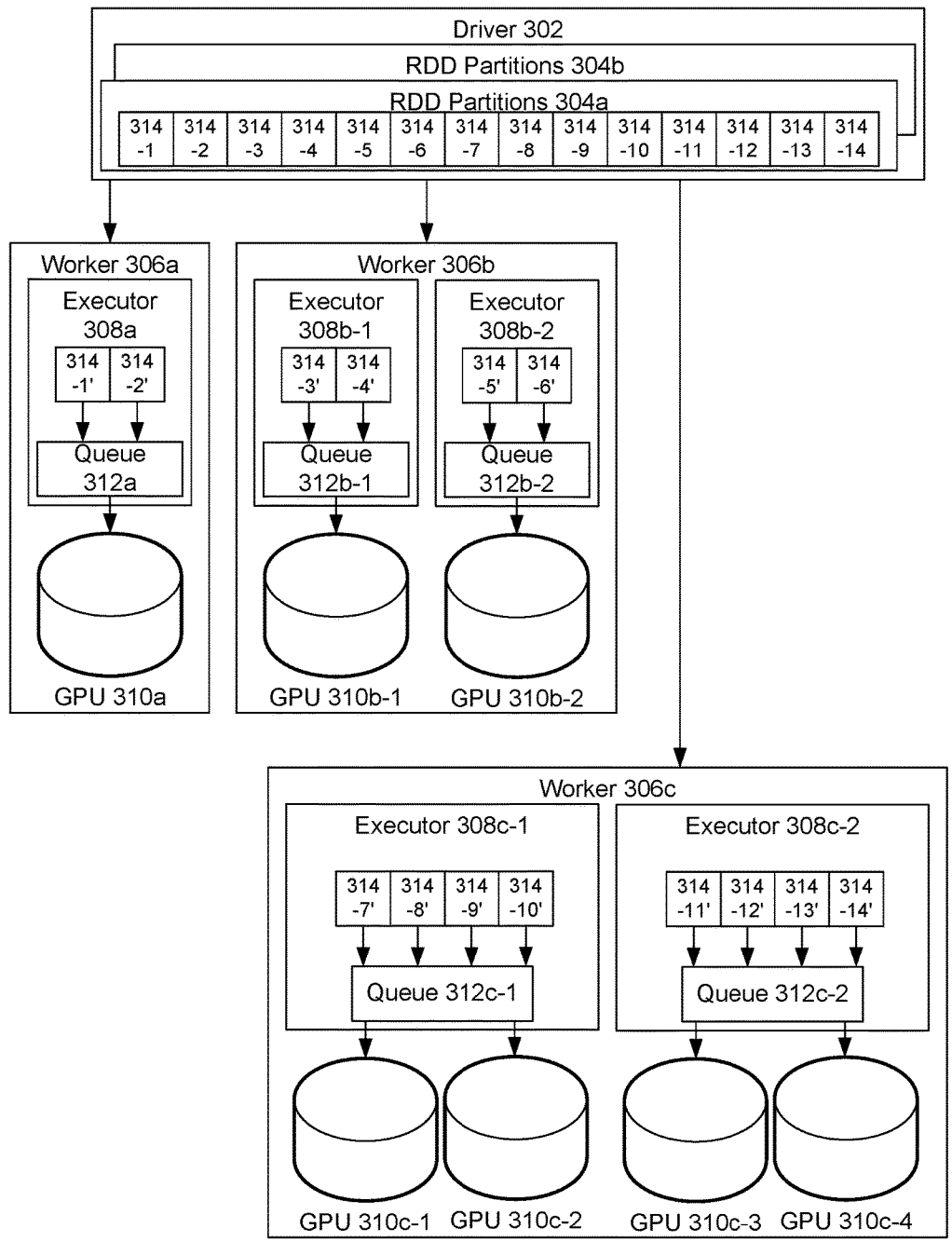
FIG. 3 illustrates using adaptive parallelism of workload execution on computers with accelerators to process a workload.

FIG. 3 illustrates using adaptive parallelism of workload execution on computers with accelerators to process a workload. In some embodiments, components of FIG. 3 may be implemented using instances of the example hardware of FIG. 1. For example, driver 302, worker 306a, worker 306b, and worker 306c may be implemented with an instance of the example hardware of FIG. 1. While the example hardware of FIG. 1 depicts a single GPU—GPU 116—both worker 306b and worker 306c are depicted as having multiple GPUs. It may be appreciated that there may be instances of the example hardware of FIG. 1 that have these multiple GPUs.

Driver 302 receives a workload to be processed and divides the workload data into multiple data partitions, such as RDD (resilient distributed dataset) partitions as an example data type—here depicted as RDD partition 304a and RDD partition 304b. As depicted, RDD partition 304a has a wave width of 14. The width of a RDD partition may be determined by implementing the operating procedures of FIGS. 7 and/or 8.

Driver 302 divides RDD partition 304a among a plurality of workers that process the RDD partition—worker 306a, worker 306b, and worker 306c. As depicted, worker 306a is assigned portions 314-1 and 314-2, worker 306b is assigned portions 314-3, 314-4, 314-5, and 314-6, and worker 306c is assigned portions 314-7, 314-8, 314-9, 314-10, 314-11, 314-12, 314-13, and 314-14.

The number of RDD partitions 314-1 through 314-14 that are assigned to a specific worker 306a-306c may be determined by that worker's characteristics, including static and dynamic CPU and GPU characteristics. The partitioning is described in more detail with respect to FIGS. 7-8 and elsewhere in the disclosure.

Here, the three workers 306a-306c are depicted as each having different characteristics that affects the number of RDD partitions 314-1 through 314-14 that they get assigned, and the number of RDD partitions 314-1 through 314-14 that are assigned to each executor 308a, 308b-1, 308b-2, 308c-1, and 308c-2. An executor may be a process executing on a worker that manages the execution of RDD partitions 314-1 through 314-14 on one or more GPUs 310a, 310b-1, 310b-2, 310c-1, 310c-2, 310c-3, and 310c-4. An executor may do this by managing a queue 312a, 312b-1, 312b-2, 312c-1, and 312c-2 that is assigned to one or more GPUs for processing.

As depicted, worker 306a has one executor 308a processing two of the RDD partitions 314-1' and 314-2', which are then offloaded onto one GPU 310a. Then, worker 306b has two executors 308b-1 and 308b-2, wherein each executor has two of the RDD partitions 314-3', 314-4', 314-5', and 314-6', with each executor corresponding to one GPU 310b-1 and 310b-2. And then, worker 306c also has two executors 310c-1 and 310c-2. Each of executors 310c-1 and 310c-2 is assigned four of the RDD partitions, 314-7', 314-8', 314-9', and 314-10', and 314-11', 314-12', 314-13', and 314-14'. Each of executors 310c-1 and 310c-2 is also responsible for managing two GPUs—here, GPUs 310c-1 and 310c-2, and GPUs 310c-3 and 310c-4, respectively.

The number of executors per worker may be set based on a combination of the number and capabilities of CPUs and GPUs available on each worker. The number of GPUs available on a given worker may be set statically, or may be dynamic based on a load placed on the worker.

FIG. 4 illustrates relationships between the amount of parallelism and the number of partitions for a given dataset. In some embodiments, determining the amount of parallelism and number of partitions for a given dataset may be performed by driver 302 of FIG. 3 as it selects RDD partitions 304a and 304b for processing by workers 306a, 306b, and 306c. Chart 400 includes a number of rows 402-420, which indicates how different characteristics of a computing cluster vary as a given dataset has a modified number of partitions 402 (the number of computing nodes available for processing the dataset) and/or parallelism for each partition 404 (sometimes referred to as a wave width, which is the amount of data within a given dataset that is to be substantially processed in parallel).

Column 422 illustrates an example of what happens with processing a given dataset as the number of partitions 402 is held constant, and the parallelism 404 is increased. Here, the total number of waves 406 used to process the dataset decreases (since each wave has a higher width), the total number of tasks 408 is constant, the shuffle time 410 decreases, the reduce time 412 (in a MapReduce job) decreases, the task concurrency per GPU 414 increases, the GPU memory pressure 416 increases, the GPU utilization 418 increases, and the scheduling overhead 420 decreases.

Column 424 illustrates an example of what happens with processing a given dataset as the number of partitions 402 is increased, and the parallelism 404 is held constant. Here, the total number of waves 406 used to process the dataset increases (since each wave width remains unchanged), the total number of tasks 408 increases, the shuffle time 410 increases, the reduce time 412 increases, the task concurrency per GPU 414 is constant, the GPU memory pressure 416 decreases (since each partition is smaller), the GPU utilization 418 decreases, and the scheduling overhead 420 increases.

Column 426 illustrates an example of what happens with processing a given dataset as the number of partitions 402 is increased, and the parallelism 404 is also increased. Here, the total number of waves 406 used to process the dataset is held constant, the total number of tasks 408 increases, the shuffle time 410 decreases, the reduce time 412 decrease, the task concurrency per GPU 414 increases, the GPU memory pressure 416 increases, the GPU utilization 418 increases, and the scheduling overhead 420 decreases.

In general, for a given dataset with a fixed number of partitions, there is a higher degree of parallelism—there is a lower shuffle and reduce time, and scheduling overhead. However, there is a need to be within the constraints of memory hierarchy and GPU compute capacity. In contrast, with an increased number of partitions, there is finer grain for the benefit of data parallelism. A higher number of waves for the same level of parallelism would increase the scheduling time. And a constant number of waves for a higher level of parallelism would yield a lower shuffle and reduce time, and scheduling overhead.

Figure 5:
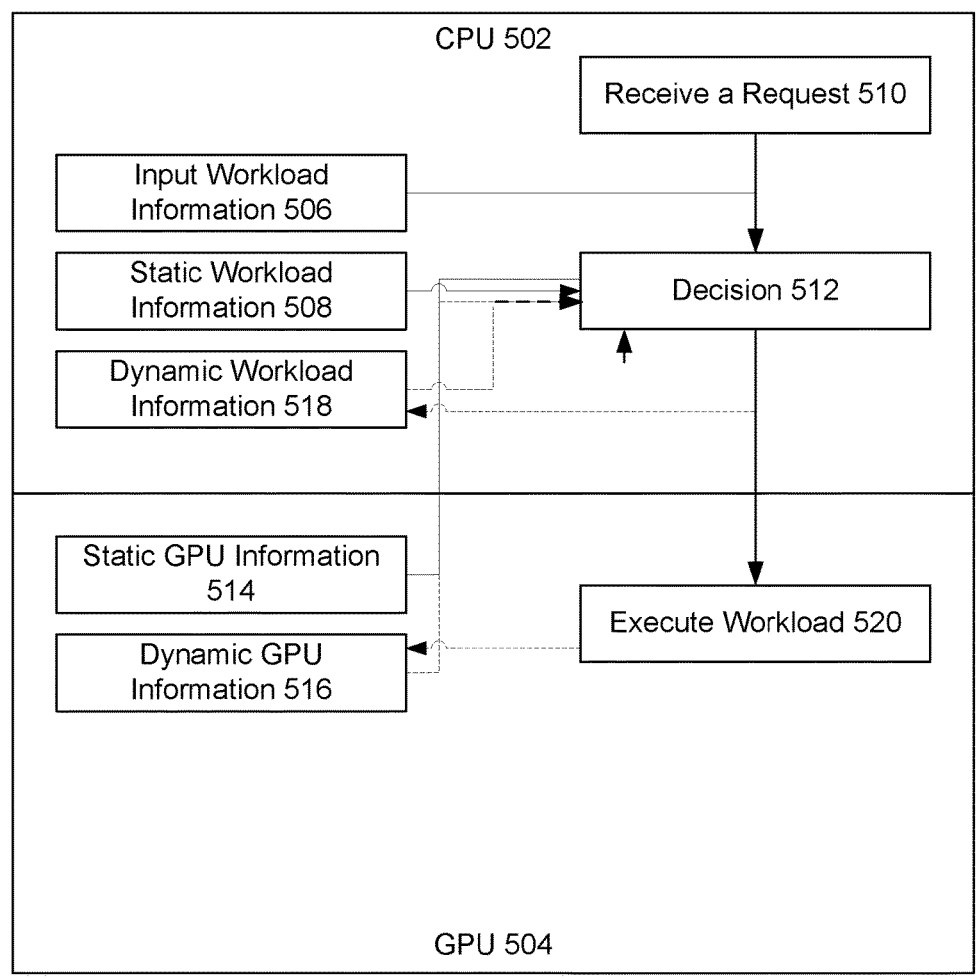
FIG. 5 illustrates how a workflow may be divided between a CPU and a GPU in adaptive parallelism.

FIG. 5 illustrates how a workflow may be divided between a CPU and a GPU in adaptive parallelism. In some embodiments where workers 306a, 306b, and 306c of FIG. 3 are implemented with instances of the example hardware of FIG. 1, this workflow may be implemented between CPU 104 and GPU 116 as a subportion of a RDD partition 304a is processed by that worker.

As depicted, the workflow of FIG. 5 is divided into information received and transmitted by a CPU 502, and information received and transmitted by a GPU 504. In some embodiments, information received and transmitted by a CPU 502 may be received and transmitted by CPU 104 of FIG. 1, and information received and transmitted by a GPU 504 may be received and transmitted by GPU 116 of FIG. 1.

On the CPU side 502, a CPU receives a request to process a workload 510. The CPU also receives or determines information about this workload 506, such as the size of the workload data in bytes. The CPU receives or determines static workload information 508, such as if there are implemented GPU kernels (also known as GPU programs) and its usage in number of registers per thread. The CPU also receives or determines dynamic workload information 518, such as memory usage of the CPU. Then, from the GPU side 504, the CPU receives static GPU information 514, such as the number of GPUs available to this workload, a corresponding memory size, and a corresponding register file size. From the GPU side 504, the CPU also receives dynamic GPU information 516, such as memory utilization and register utilization, since the GPU may be shared by multiple workloads.

The CPU uses this received information to determine 512 a number of RDD partitions per wave to divide the workload into. The CPU then indicates to the GPU side 504 for the GPU to execute the workload 520 and update the GPU and workload information.

As depicted, there are dashed lines between executing the workload 520 and dynamic GPU information 516, executing the workload 520 and dynamic workload information 518, dynamic GPU information 516 and determining 512 a number of RDD partitions per wave to divide the workload into, dynamic workload information and determining 512 a number of RDD partitions per wave to divide the workload into, and determining 512 a number of RDD partitions per wave to divide the workload into and executing the workload 520. These dashed lines are dashed to indicate that they involve passing dynamic information that may change over time, and which may be used to modify determining 512 a number of RDD partitions per wave to divide the workload into over time. These dashed lines are seen in contrast to the solid lines depicted, which indicate that static information is being conveyed.

Figure 6:
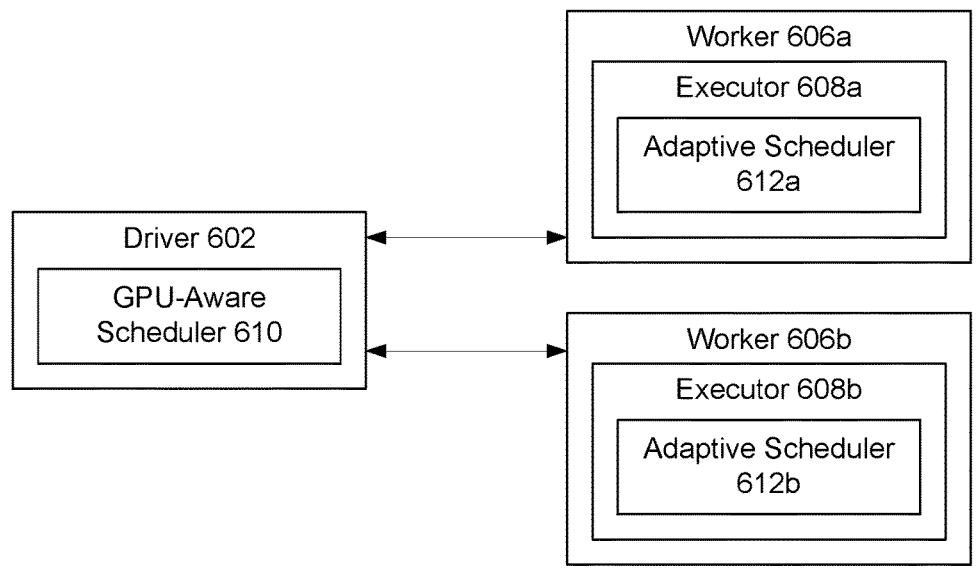
FIG. 6 illustrates how scheduling execution of a workload may be divided among multiple nodes using adaptive parallelism.

FIG. 6 illustrates how scheduling execution of a workload may be divided among multiple nodes using adaptive parallelism. In some embodiments, driver 602 may be implemented with driver 302 of FIG. 3, and worker 606a and worker 406b may be implemented with worker 606a and worker 306b of FIG. 3, respectively, to perform adaptive scheduling of a dataset, such as a dataset comprising RDD partitions 304a and 304b.

As depicted, driver 602 comprises a GPU aware scheduler 610. The GPU aware scheduler 608 may make decisions in performing adaptive scheduling of a dataset by looking at as many as all of the workers, including as many as all of those worker characteristics, including CPU and GPU characteristics.

Then, within worker 606a and worker 606b, respectively, are executor 608a and executor 608b, which may perform functions similar to executor 308a and executor 308b of FIG. 3. Worker 606a and worker 606b may include an adaptive scheduler 612a and an adaptive scheduler 612b, respectively. Adaptive schedulers 612a-b may capture detailed information about current resource usage for their workers, and provide this usage back to GPU aware scheduler 610 to make adaptive scheduling determinations.

Figure 7:
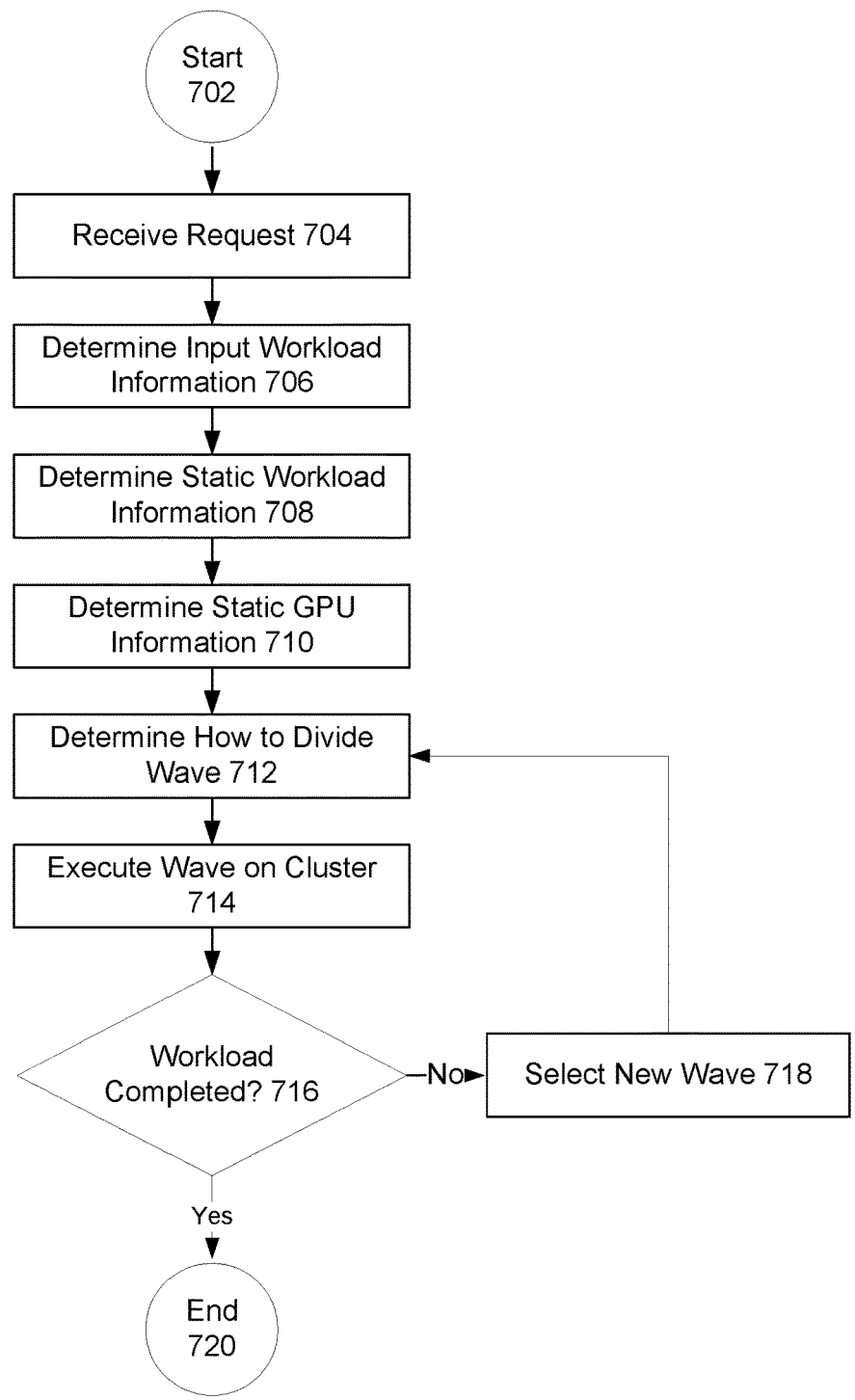
FIG. 7 illustrates example operating procedures for using adaptive parallelism based on static GPU characteristics to process a workload.
Figure 8:
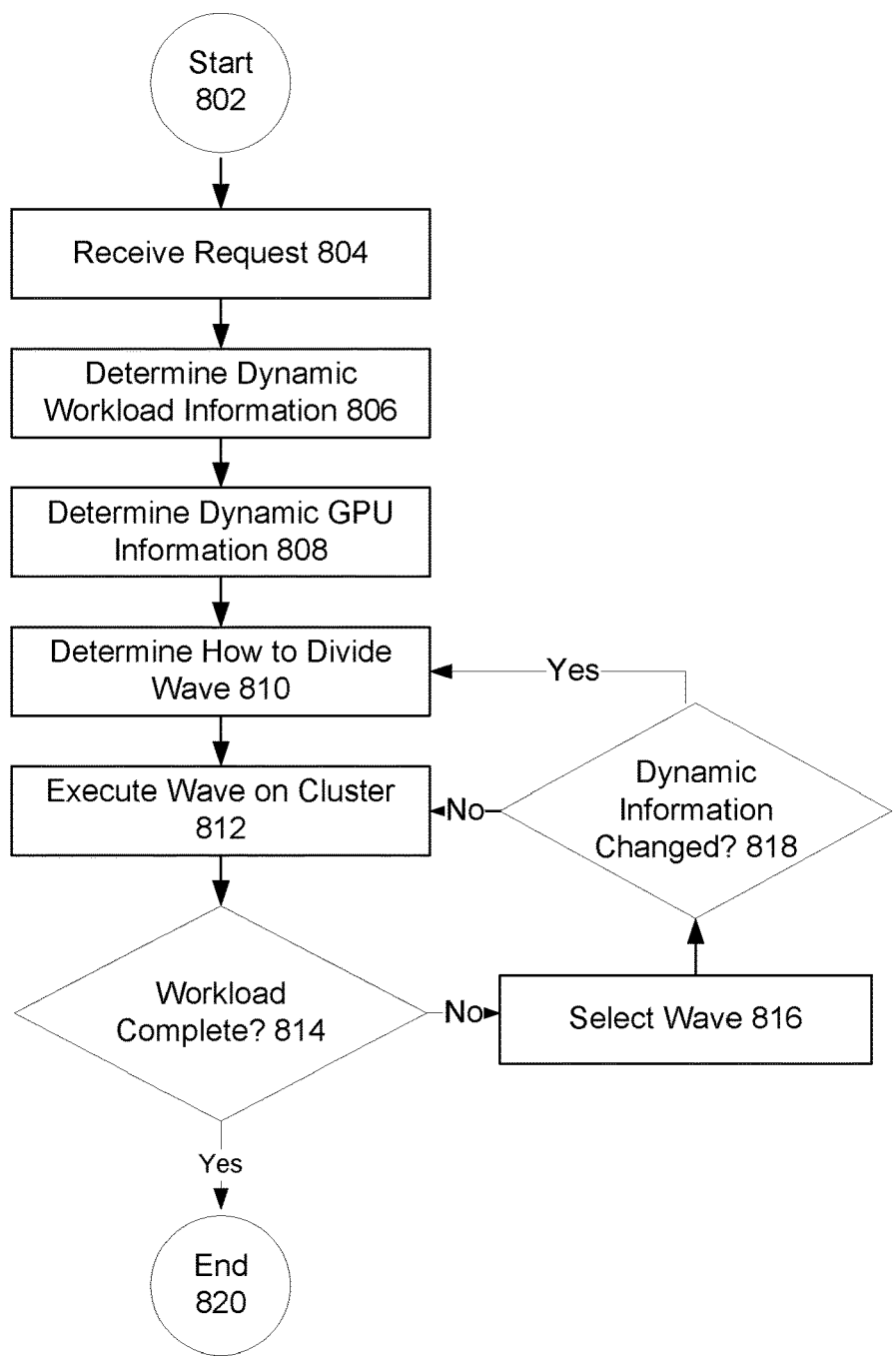
FIG. 8 illustrates example operating procedures for using adaptive parallelism based on dynamic GPU characteristics to process a workload.

With the foregoing overview it may be helpful now to consider a high-level discussion of an example process. To that end, FIGS. 7 and 8 presents an example operating procedure for using adaptive parallelism based on static GPU characteristics to process a workload and example operating procedures for using adaptive parallelism based on dynamic GPU characteristics to process a workload, respectively. The processes are illustrated as a collection of blocks in logical flowcharts, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes of FIGS. 7 and 8 are described with reference to the architectures of FIGS. 1, 3, 5, and 6.

In some embodiments, the operating procedure of FIG. 7 may be implemented in driver 302 of FIG. 3 as driver 302 divides a dataset (in FIG. 3, comprising RDD partitions 304*a* and 304*b*) amongst a plurality of workers (in FIG. 3, workers 306*a*, 306*b*, and 306*c*) using adaptive parallelism based on static GPU characteristics. In some embodiments, the operating procedures of FIG. 7 may be implemented for adaptive parallelism for processing a plurality of workloads on a plurality of computers, at least a first computer of the plurality of computers having a graphics processing unit (GPU) used in executing the workload.

While the operations of FIG. 7 (and FIG. 8) primarily describe a GPU or a CPU, and two computers, it may be appreciated that these techniques may be more broadly applied to computing clusters with more than two computers, where each of those computers may have multiple CPUs and/or GPUs. For example, the example system architecture of FIG. 3 depicts workers with multiple GPUs (and these workers may each have multiple CPUs, though CPUs are not explicitly depicted in FIG. 3).

It may be appreciated that there may be embodiments where the operating procedures of FIG. 7 are performed in a different order than are depicted here. It may also be appreciated that there may be embodiments that implement more, or fewer, operating procedures than are depicted here. Additionally, it may be appreciated that these operating procedures may be implemented in conjunction with the operating procedures of FIG. 8 to perform operations for using adaptive parallelism based on both static GPU characteristics and dynamic GPU characteristics to process a workload.

The operating procedures of FIG. 7 begin with operation 702 and move to operation 704. Operation 704 depicts receiving a request to process a workload. In some embodiments, this request may comprise a workload to process and a request that it be processed, and be received from another computer, across a communications network. In other embodiments, this may comprise receiving the request to process the workload through local input, such as keyboard input, to a computer that implements these operating procedures. After operation 704, the operating procedures of FIG. 7 move to operation 706.

Operation 706 depicts determining input workload information. This input workload information may include information about the size of the workload of operation 702, such as described with respect to input workload info 506 of FIG. 5. In some embodiments, this input workload information may be determined by analyzing the workload to determine its size, or as information separate from the workload itself that is included with the request. After operation 706, the operating procedures of FIG. 7 move to operation 708.

Operation 708 depicts determining static workload information. In some embodiments, this static workload information may include an indication of whether there are implemented GPU kernels and its usage in number of registers per thread, such as described with respect to static workload information 508 of FIG. 5. In some embodiments, this static workload information may be included as information separate from the workload itself that is included with the request. After operation 708, the operating procedures of FIG. 7 move to operation 710.

Operation 710 depicts determining static GPU information. This static GPU information may include information such as, for each computer on which the workload may execute, a number of GPUs that that computer has, a memory size of each GPU, and a register file size of the GPU. This static GPU information is described with respect to static GPU information 514 of FIG. 5.

In some embodiments, this static GPU information may be received from adaptive scheduler 612*a* and adaptive scheduler 612*b* by driver 602 of FIG. 6, as scheduler 612*a* and adaptive scheduler 612*b* provide information for all or a subset of the GPUs on their respective workers—worker 606*a* and worker 606*b*.

In some embodiments, operation 710 may comprise receiving information about a configuration of a first computer, the information about the first computer comprising an indication about a first characteristic of the GPU that remains constant regardless of a workload performed by the GPU. In some embodiments, the first characteristic of the GPU that remains constant regardless of a workload performed by the GPU comprises an amount of local memory available to the GPU, a caching efficiency of the GPU, or a number of registers available to the GPU.

In some embodiments, operation 710 may also comprise receiving CPU, or other system, information. In some embodiments operation 710 may comprise receiving information about a configuration of a second computer of a plurality of computers. After operation 710, the operating procedures of FIG. 7 move to operation 712.

Operation 712 depicts determining how to divide a wave of the workload. With respect to the architecture of FIG. 3, this operation may be performed by driver 302 as it divides waves of a workload into RDD partitions 304*a* and RDD partitions 304*b*, and then as each of the RDD partitions is divided among executor 308*a*, executor 308*b*-1, executor 308*b*-2, executor 308*c*-1, and executor 308*c*. Or, with respect to the architecture of FIG. 6, this operation may be performed by driver 602 of FIG. 6 as it divides waves of a workload between executor 608*a* and executor 608*b*.

In some embodiments, operation 712 may include determining a number of waves of the workload in the first place. Where the size of the workload does not change, determining the number of waves of the workload may be an equivalent operation to determining a wave width of the workload (since, one may determine wave width based on the size of the workload and number of waves, and one may determine number of waves based on the size of the workload and wave width).

In determining how to divide the waves of the workload, such as where this operation is performed by driver 302 of FIG. 3, driver 302 may factor in the information already received—input workload information from operation 706, static workload information from operation 708, and static GPU information from operation 710.

In some embodiments, operation 712 may comprise dividing a first wave into a first subportion and a second subportion based on a static characteristic of the GPU. In some embodiments, operation 712 may comprise dividing the first wave into a first subportion and a second subportion based on a characteristic of a CPU of a first computer.

In some embodiments, operation 712 may comprise dividing a first wave of a plurality of waves into a first subportion and a second subportion based on a first characteristic of the GPU, a second characteristic of the GPU, and a configuration of a second computer.

In some embodiments, operation 712 comprises assigning a first subportion to a first computer for execution, and a second subportion to a second computer for execution. In some embodiments where a GPU of a first computer is one of a plurality of GPUs of the first computer, operation 712 comprises assigning one part of a first subportion to be executed with the GPU and a second part of the first subportion to be executed with a second GPU of the computer. In some embodiments where a GPU of a first computer is one of a first plurality of GPUs of the first computer, operation 712 comprises assigning one part of a first subportion to be executed with the first plurality of GPUs and a second part of the first subportion to be executed with a second plurality of GPUs of the computer. After operation 712, the operating procedures of FIG. 7 move to operation 714.

Operation 714 depicts executing the wave on a computing cluster per the determination of how to divide it among the computing cluster of operation 712. With regard to the architecture of FIG. 3, this may comprise driver 302 indicating to worker 306a for executor 308a to process RDD partitions 314-1 and 314-2; driver 302 indicating to worker 306b for executor 308b-1 to process RDD partitions 314-3 and 314-4, and for executor 308b-2 to process RDD partitions 314-5 and 314-6; and driver 302 indicating to worker 306c for executor 308c-1 to process RDD partitions 314-7, 314-8, 314-9, and 314-10, and for executor 308c-2 to process RDD partitions 314-11, 314-12, 314-13, and 314-14.

With regard to the architecture of FIG. 6, executing the wave on a computing cluster may comprise driver 602 indicating to worker 606a to process some subportion of the wave, and driver 602 indicating to worker 606b to process the other subportion of the wave. After operation 714, the operating procedures of FIG. 7 move to operation 716.

Operation 716 depicts determining whether the workload has been completed by executing the wave in operation 714. With regard to the system architecture of FIG. 3, this may comprise driver 302 determining whether any RDD partition of the workload remains to be executed.

With regard to the system architecture of FIG. 6, driver 602 may perform a similar operation. If in operation 716, it is determined that the workload completed, the operating procedures of FIG. 7 move to operation 720, where the operating procedures of FIG. 7 end. Instead, if in operation 716 it is determined that there is another wave of the workload to execute, then the operating procedures of FIG. 7 move to operation 718.

Operation 718 depicts selecting a new wave. In some embodiments, this may comprise driver 302 of FIG. 3 or driver 602 of FIG. 6 selecting a RDD partition or wave that follows the RDD partition or wave that was executed in operation 714 (where there is an order in which these RDD partitions or waves are to be executed).

After operation 718, the operating procedures of FIG. 7 return to operation 712, where it is determined how to divide this next wave. In some embodiments where how waves are divided is not updated based on dynamic system information (such as described with respect to FIG. 8), it may be that how to divide each wave is determined in the initial execution of operation 712. In these scenarios, operation 718 may instead return to operation 714 where this next wave is executed on the cluster.

FIG. 8 illustrates example operating procedures for using adaptive parallelism based on dynamic GPU characteristics to process a workload. In some embodiments, the operating procedures of FIG. 8 may be implemented in driver 302 of FIG. 3 as driver 302 divides a dataset (in FIG. 3, comprising RDD partitions 304a and 304b) amongst a plurality of workers (in FIG. 3, workers 306a, 306b, and 306c) using adaptive parallelism based on dynamic GPU characteristics. In some embodiments, the operating procedures of FIG. 8 may be implemented for adaptive parallelism for processing a plurality of workloads on a plurality of computers, at least a first computer of the plurality of computers having a graphics processing unit (GPU) used in executing the workload.

It may be appreciated that there may be embodiments where the operating procedures of FIG. 8 are performed in a different order than are depicted here. It may also be appreciated that there may be embodiments that implement more, or fewer, operating procedures than are depicted here. Additionally, it may be appreciated that these operating procedures may be implemented in conjunction with the operating procedures of FIG. 7 to perform operations for using adaptive parallelism based on both static GPU characteristics and dynamic GPU characteristics to process a workload.

The operating procedures of FIG. 8 begin with operation 802 and then move to operation 804. Operation 804 depicts receiving a request to process a workload. In some embodiments, operation 804 may be performed in a similar manner as operation 704 of FIG. 7. After operation 804, the operating procedures of FIG. 8 move to operation 806.

Operation 806 depicts determining dynamic workload information. In some embodiments, this dynamic workload information may be generated as the workload is being processed on a computing cluster. This dynamic workload information may include information such as memory usage, such as described with regard to dynamic workload information 518 of FIG. 5 (which is updated based on executing the workload and updating GPU and workload information 520). After operation 806, the operating procedures of FIG. 8 move to operation 808.

Operation 808 depicts determining dynamic GPU information. In some embodiments, this dynamic workload information may be generated as the workload is being processed on a computing cluster. In some embodiments, this dynamic GPU information may include memory utilization and register usage, such as described with regard to dynamic GPU information 516 of FIG. 5 (which is updated based on executing the workload and updating GPU and workload information 520).

In some embodiments, operation 808 may comprise receiving information about a configuration of a first computer, the information about the first computer comprising an indication about a second characteristic of the GPU that may vary based on the workload performed by the GPU. In some embodiments, the second characteristic of the GPU that may vary based on the workload performed by the GPU comprises number of GPUs available, a utilization of the GPU, a usage of memory registers of the GPU, or an occupancy of the GPU.

In some embodiments, operation 808 may comprise receiving information about a dynamic characteristic of a graphics processing unit (GPU) for a first computer. In some embodiments, the dynamic characteristic of the GPU may vary based on a workload performed by the GPU.

In some embodiments, operation 808 also includes determining dynamic CPU, or other system, information. In some embodiments, operation 808 may comprise receiving information about a configuration of a second computer of the plurality of computers. After operation 808, the operating procedures of FIG. 8 move to operation 810.

Operation 810 is reached from operation 808, or from operation 816 where it is determined that the dynamic information has changed. Operation 810 depicts determining how to divide a wave of the workload. In some embodiments, operation 810 may be performed in a similar manner as operation 712 of FIG. 7.

In some embodiments, operation 810 may comprise dividing a first wave of a plurality of waves into a first subportion and a second subportion based on a first characteristic of the GPU, a second characteristic of the GPU, and a configuration of a second computer. In some embodiments, operation 810 comprises dividing a first wave into a first subportion and a second subportion based on the dynamic characteristic of a GPU. In some embodiments, operation 810 comprises assigning a first subportion to a computer for processing, and a second subportion to a second computer for processing.

In some embodiments, operation 810 comprises assigning a first subportion to a first computer for execution, and a second subportion to a second computer for execution. In some embodiments where a GPU of a first computer is one of a plurality of GPUs of the first computer, operation 810 comprises assigning one part of a first subportion to be executed with the GPU and a second part of the first subportion to be executed with a second GPU of the computer. In some embodiments where a GPU of a first computer is one of a first plurality of GPUs of the first computer, operation 810 comprises assigning one part of a first subportion to be executed with the first plurality of GPUs and a second part of the first subportion to be executed with a second plurality of GPUs of the computer.

In some embodiments where operation 810 is reached from operation 816, operation 810 may comprise dividing a second wave of the workload into a third subportion and a fourth subportion based on the first characteristic of the GPU, a changed second characteristic of the GPU, and a configuration of the second computer. In additional embodiments where operation 810 is reached from operation 816, operation 810 may comprise, in response to determining that a value for the dynamic characteristic has changed, dividing a second wave into a third subportion and a fourth subportion based on a changed value for a dynamic characteristic of a GPU. In further embodiments where operation 810 is reached from operation 816, operation 810 may comprise assigning the third subportion to the first computer for execution, and the fourth subportion to the second computer for execution. And in further embodiments where operation 810 is reached from operation 816, operation 810 may comprise assigning a third subportion to a first computer for processing, and a fourth subportion to a second computer for processing. After operation 810, the operating procedures of FIG. 8 move to operation 812.

Operation 812 is reached from operation 810, or from operation 816, where it is determined that the dynamic information has not changed. Operation 812 depicts executing the wave on a computing cluster. In some embodiments, operation 812 may be performed in a similar manner as operation 714 of FIG. 7. After operation 712, the operating procedures of FIG. 8 move to operation 814.

Operation 814 depicts determining whether the workload has been completed. With regard to the system architecture of FIG. 3, this may comprise driver 302 receiving an indication from each of executor 308a, executor 308b-1, executor 308b-2, executor 308c-1, and executor 308c-2 that each of those executors has processed its respective subportion of the wave executed in operation 812 (e.g., executor 308a has processed RDD partitions 314-1 and 314-2). Then, determining whether the workload has been completed may be performed in a similar manner as operation 714 of FIG. 7.

Where a workload is divided into multiple waves RDD partitions (such as RDD partitions 304a and RDD partitions 304b of FIG. 3), operation 814 may comprise determining whether all such waves of RDD partitions have been processed.

If in operation 814 it is determined that the workload has been completed, then the operating procedures of FIG. 8 move to operation 820, where the operating procedures of FIG. 8 end. However, if in operation 814 it is determined that the workload has not yet been completed, then the operating procedures of FIG. 8 move to operation 816.

Operation 816 is reached from operation 814 where in operation 814 it is determined that the workload has not yet been completed. Operation 816 depicts selecting a new wave of the workload, and may be performed in a similar manner as operation 718 of FIG. 7. After operation 816, the operating procedures of FIG. 8 move to operation 818.

Operation 818 depicts determining whether dynamic information has changed. This dynamic information may be dynamic GPU information, such as memory utilization or registry usage, as described with respect to operation 516 of FIG. 5. In some embodiments, this dynamic information may include the dynamic workload information of operation 518 of FIG. 5.

In some embodiments, each worker or executor (such as worker 606a and worker 606b, or executor 608a and executor 608b of FIG. 6) may send an indication that dynamic information has changed to driver 602 of FIG. 6, which may make a determination that some of the dynamic information of the computers of the computing cluster has changed. Where some of this dynamic information has changed, it may be determined in operation 816 that the dynamic information has changed.

In some embodiments, operation 816 comprises receiving an indication that a value of a second characteristic of a GPU has changed after assigning a first subportion to a first computer. If in operation 816 it is determined that the dynamic information has changed, the operating procedures of FIG. 8 return to operation 810, where the next wave to execute is divided based on this changed dynamic information. However, if in operation 816 it is determined that the dynamic information has not changed, the operating procedures of FIG. 8 return to operation 812, where the next wave is divided among the computing cluster in a similar manner as the previous wave was divided among the computing cluster.

Detailed embodiments of the claimed structures and methods are disclosed herein. However, it can be understood that the disclosed embodiments are merely illustrative of the claimed structures and methods that may be embodied in various forms. The present disclosure may, however, be embodied in many different forms and should not be construed as limited to the example embodiments set forth herein. Rather, these example embodiments are provided so that this disclosure will be thorough and complete and will fully convey the scope of the present disclosure to those skilled in the art. In the description, details of well-known features and techniques may be omitted to avoid unnecessarily obscuring the presented embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible and/or non-transitory device that may retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD, alternatively known as a digital video disc), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as a Smalltalk or C++ programming language or the like, and conventional procedural programming languages, such as a C programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an (ISP) Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure, and these illustrations may comprise one or more operating procedures. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for adaptive parallelism for processing a workload on a plurality of computers, the workload comprising a first wave and a second wave, at least a first computer of the plurality of computers having a computational accelerator that is separate from a central processing unit (CPU) used in executing the workload, the method comprising:

receiving information about a configuration of the first computer, the information about the first computer comprising an indication about a first characteristic of the computational accelerator that remains constant regardless of an amount of work performed by the computational accelerator, and a second characteristic of the computational accelerator that varies based on an amount of work performed by the computational accelerator;

receiving information about a configuration of a second computer of the plurality of computers;

dividing the first wave of the workload into a first subportion and a second subportion based on the first characteristic of the computational accelerator, the second characteristic of the computational accelerator, and the configuration of the second computer;

assigning the first subportion to the first computer for execution, and the second subportion to the second computer for execution;

after assigning the first subportion to the first computer, receiving an indication that a value of the second characteristic of the computational accelerator has changed;

dividing the second wave of the workload into a third subportion and a fourth subportion based on the first characteristic of the computational accelerator, the changed second characteristic of the computational accelerator, and the configuration of the second computer; and assigning the third subportion to the first computer for execution, and the fourth subportion to the second computer for execution.

2. The method of claim 1, wherein the first characteristic of the computational accelerator that remains constant regardless of an amount of work performed by the computational accelerator comprises an amount of local memory available to the computational accelerator, a caching efficiency of the computational accelerator, or a number of registers available to the computational accelerator.

3. The method of claim 1, wherein the second characteristic of the computational accelerator that may vary based on an amount of work performed by the computational accelerator comprises a number of computational accelerators available, a utilization of the computational accelerator, a usage of memory registers of the computational accelerator, or an occupancy of the computational accelerator.

4. The method of claim 1, wherein:

the computational accelerator of the first computer is one of a plurality of computational accelerators of the first computer; and assigning the first subportion to the first computer for execution comprises:

assigning one part of the first subportion to be executed with the computational accelerator; and assigning a second part of the first subportion to be executed with a second computational accelerator of the computer.

5. The method of claim 1, wherein:

the computational accelerator of the first computer is one of a first plurality of computational accelerators of the first computer; and assigning the first subportion to the first computer for execution comprises:

assigning one part of the first subportion to be executed with the first plurality of computational accelerators; and assigning a second part of the first subportion to be executed with a second plurality of computational accelerators of the computer.

6. The method of claim 1, wherein the computational accelerator comprises a graphics processing unit (GPU).

7. A computer system configured for adaptive parallelism for processing a workload on a plurality of computers, the computer system comprising:

a processor, a computer-readable memory, a computer-readable tangible storage device, and program instructions stored on the storage device for execution by the processor via the memory, wherein execution of the program instructions by the computer system configures the computer system to:

receive information about a dynamic characteristic of a computational accelerator for a first computer, wherein the dynamic characteristic of the computational accelerator varies based on an amount of work performed by the computational accelerator;

divide a first wave of a workload into a first subportion and a second subportion based on the dynamic characteristic of the computational accelerator; and assign the first subportion to the first computer for processing, and the second subportion to a second computer for processing.

8. The computer system of claim 7, wherein execution of the program instructions further configures the computer system to:

divide the first wave into the first subportion and the second subportion based on a static characteristic of the computational accelerator.

9. The computer system of claim 8, wherein the static characteristic of the computational accelerator comprises an amount of local memory available to the computational accelerator, a caching efficiency of the computational accelerator, or a number of registers available to the computational accelerator.

10. The computer system of claim 7, wherein execution of the program instructions further configures the computer system to:

divide the first wave into the first subportion and the second subportion based on a characteristic of a central processing unit (CPU) of the first computer.

11. The computer system of claim 7, wherein execution of the program instructions further configures the computer system to, in response to determining that a value for the dynamic characteristic has changed:

divide a second wave of the workload into a third subportion and a fourth subportion based on a changed value for the dynamic characteristic of the computational accelerator;

assign the third subportion to the first computer for processing; and assign the fourth subportion to a second computer for processing.

12. The computer system of claim 7, wherein the dynamic characteristic of the computational accelerator comprises a number of computational accelerators available, a utilization of the computational accelerator, a usage of memory registers of the computational accelerator, or an occupancy of the computational accelerator.

13. A computer program product operative to perform adaptive parallelism for processing a workload on a plurality of computers, the computer program product comprising:
   a computer readable storage medium having programming instructions embodied therewith, the program instructions executable by a computer cause the computer to:
      receive information about a dynamic characteristic of a computational accelerator for a first computer;
      divide a first wave of a workload into a first subportion and a second subportion based on the dynamic characteristic of the computational accelerator;
      assign the first subportion to the first computer for processing, and the second subportion to a second computer for processing, and
      in response to determining that a value for the dynamic characteristic has changed, divide a second wave of the workload into a third subportion and a fourth subportion based on the changed value for the dynamic characteristic of the computational accelerator; and
      assign the third subportion to the first computer for processing, and the fourth subportion to a second computer for processing.

14. The computer program product of claim 13, wherein the program instructions executable by the computer further cause the computer to:
   divide the first wave into the first subportion and the second subportion based on a static characteristic of the computational accelerator.

15. The computer program product of claim 14, wherein the static characteristic of the computational accelerator comprises an amount of local memory available to the computational accelerator, a caching efficiency of the computational accelerator, or a number of registers available to the computational accelerator.

16. The computer program product of claim 13, wherein the program instructions executable by the computer further cause the computer to:
   divide the first wave into the first subportion and the second subportion based on a characteristic of a central processing unit (CPU) of the first computer.

17. The computer program product of claim 13, wherein the dynamic characteristic of the computational accelerator may vary based on a workload performed by the computational accelerator.

18. The computer program product of claim 13, wherein the dynamic characteristic of the computational accelerator comprises a number of computational accelerators available, a utilization of the computational accelerator, a usage of memory registers of the computational accelerator, or an occupancy of the computational accelerator.

* * * * *